US009182945B2

(12) United States Patent
Boden et al.

(10) Patent No.: US 9,182,945 B2
(45) Date of Patent: Nov. 10, 2015

(54) AUTOMATIC GENERATION OF USER STORIES FOR SOFTWARE PRODUCTS VIA A PRODUCT CONTENT SPACE

(71) Applicant: International Business Machines Corporation, Armonk, NY (US)

(72) Inventors: Edward B. Boden, Highland, NY (US); Robert C. Hansen, Johnson City, NY (US); Daniel J. Moravec, Wabasha, MN (US)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 13/648,690

(22) Filed: Oct. 10, 2012

(65) Prior Publication Data
US 2013/0042220 A1 Feb. 14, 2013

Related U.S. Application Data

(63) Continuation of application No. 13/070,675, filed on Mar. 24, 2011.

(51) Int. Cl.
*G06F 9/44* (2006.01)
*G06F 7/76* (2006.01)

(52) U.S. Cl.
CPC ... *G06F 8/10* (2013.01); *G06F 7/76* (2013.01)

(58) Field of Classification Search
None
See application file for complete search history.

(56) References Cited

U.S. PATENT DOCUMENTS

| 5,617,568 | A | 4/1997 | Ault et al. |
| 6,342,907 | B1 | 1/2002 | Petty et al. |
| 6,367,077 | B1 | 4/2002 | Brodersen et al. |
| 6,536,036 | B1 | 3/2003 | Pavela |
| 6,799,718 | B2 | 10/2004 | Chan et al. |
| 6,910,041 | B2 | 6/2005 | Exton et al. |
| 7,000,184 | B2 | 2/2006 | Matveyenko et al. |
| 7,127,707 | B1 | 10/2006 | Mishra et al. |
| 7,139,737 | B2 | 11/2006 | Takahashi et al. |
| 7,149,699 | B2 | 12/2006 | Barnard et al. |
| 7,210,066 | B2 | 4/2007 | Mandava et al. |
| 7,272,752 | B2 | 9/2007 | Farchi et al. |

(Continued)

FOREIGN PATENT DOCUMENTS

| CA | 2680978 A1 | 4/2010 |
| CN | 101833507 B | 12/2011 |

(Continued)

OTHER PUBLICATIONS

Achim D. Brucker et al., "HOL-TestGen An Interactive Test-case Generation Framework,"; M. Chechik and M. Wirsing (Eds.): FASE 2009, LNCS 5503, pp. 417-420, 2009.

(Continued)

*Primary Examiner* — Don Wong
*Assistant Examiner* — Deric Ortiz
(74) *Attorney, Agent, or Firm* — Cantor Colburn LLP; William A. Kinnaman, Jr.

(57) ABSTRACT

Exemplary embodiments include a computer-implemented method for generating agile user stories, the method including collecting, by a processor, a plurality of requirements, creating, by the processor, a plurality of content space specification files that includes the plurality of requirements, processing, by the processor, the plurality of content space specification files to generate the user stories and outputting, by the processor, the user stories.

16 Claims, 12 Drawing Sheets

(56) References Cited

U.S. PATENT DOCUMENTS

| | | |
|---|---|---|
| 7,467,198 B2 | 12/2008 | Goodman et al. |
| 7,467,202 B2 | 12/2008 | Savchuk |
| 7,503,037 B2 | 3/2009 | Banerjee et al. |
| 7,509,626 B1 | 3/2009 | Barnes et al. |
| 7,512,957 B2 | 3/2009 | Cohen et al. |
| 7,530,057 B2 | 5/2009 | Babcock |
| 7,555,742 B2 | 6/2009 | Iborra et al. |
| 7,562,338 B2 | 7/2009 | Knutson et al. |
| 7,581,205 B1 | 8/2009 | Massoudi |
| 7,587,636 B2 | 9/2009 | Tillmann et al. |
| 7,752,606 B2 | 7/2010 | Savage |
| 7,761,591 B2 | 7/2010 | Graham |
| 7,778,899 B2 | 8/2010 | Scumniotales et al. |
| 7,861,178 B2 | 12/2010 | Lui et al. |
| 7,904,890 B1 | 3/2011 | Hsieh et al. |
| 7,979,796 B2 | 7/2011 | Williams et al. |
| 8,006,222 B2 | 8/2011 | Ruhe |
| 8,032,860 B2 | 10/2011 | Piehler et al. |
| 8,037,453 B1 | 10/2011 | Zawadzki |
| 8,069,435 B1 | 11/2011 | Lai |
| 8,104,018 B2 | 1/2012 | Chessell et al. |
| 8,112,814 B2 | 2/2012 | Shimizu |
| 8,347,263 B1 | 1/2013 | Offer |
| 8,407,669 B2 | 3/2013 | Yee et al. |
| 8,429,708 B1 | 4/2013 | Tandon |
| 8,458,646 B2 | 6/2013 | Knutson et al. |
| 8,566,779 B2 | 10/2013 | Sukhenko et al. |
| 8,577,937 B1 | 11/2013 | Offer |
| 8,645,341 B2 | 2/2014 | Salman et al. |
| 8,645,907 B2 | 2/2014 | Jain et al. |
| 8,701,078 B1 | 4/2014 | Holler et al. |
| 8,707,248 B2 | 4/2014 | Sawant et al. |
| 8,875,088 B1 | 10/2014 | Holler et al. |
| 2001/0013024 A1 | 8/2001 | Takahashi et al. |
| 2002/0016953 A1 | 2/2002 | Sollich |
| 2002/0111808 A1 | 8/2002 | Feinberg |
| 2002/0124072 A1 | 9/2002 | Tormasov et al. |
| 2002/0149614 A1 | 10/2002 | Biebesheimer et al. |
| 2002/0165912 A1 | 11/2002 | Wenocur et al. |
| 2002/0178360 A1 | 11/2002 | Wenocur et al. |
| 2002/0194483 A1 | 12/2002 | Wenocur et al. |
| 2002/0194501 A1 | 12/2002 | Wenocur et al. |
| 2002/0199001 A1 | 12/2002 | Wenocur et al. |
| 2002/0199096 A1 | 12/2002 | Wenocur et al. |
| 2003/0009694 A1 | 1/2003 | Wenocur et al. |
| 2003/0041110 A1 | 2/2003 | Wenocur et al. |
| 2003/0056173 A1 | 3/2003 | Copenhaver et al. |
| 2003/0093716 A1 | 5/2003 | Farchi et al. |
| 2003/0121011 A1 | 6/2003 | Carter |
| 2004/0025166 A1 | 2/2004 | Adlung et al. |
| 2004/0143811 A1 | 7/2004 | Kaelicke et al. |
| 2004/0204970 A1 | 10/2004 | Boden et al. |
| 2005/0039045 A1 | 2/2005 | Wheeler |
| 2005/0044197 A1 | 2/2005 | Lai |
| 2005/0055399 A1 | 3/2005 | Savchuk |
| 2005/0114331 A1 | 5/2005 | Wang et al. |
| 2005/0114771 A1 | 5/2005 | Piehler et al. |
| 2005/0114830 A1 | 5/2005 | Knutson et al. |
| 2005/0144529 A1 | 6/2005 | Gotz et al. |
| 2005/0160405 A1 | 7/2005 | Lunia et al. |
| 2006/0036935 A1 | 2/2006 | Warner et al. |
| 2006/0150200 A1 | 7/2006 | Cohen et al. |
| 2006/0230410 A1 | 10/2006 | Kurganov et al. |
| 2006/0287959 A1 | 12/2006 | Blecken |
| 2007/0005300 A1 | 1/2007 | Haggerty et al. |
| 2007/0006160 A1 | 1/2007 | Kunz et al. |
| 2007/0156693 A1 | 7/2007 | Soin et al. |
| 2007/0168918 A1 | 7/2007 | Metherall et al. |
| 2007/0250815 A1 | 10/2007 | Bendapudi et al. |
| 2008/0027742 A1 | 1/2008 | Maeda |
| 2008/0066071 A1 | 3/2008 | Jain et al. |
| 2008/0102422 A1 | 5/2008 | Hayes et al. |
| 2008/0120602 A1 | 5/2008 | Comstock et al. |
| 2008/0148253 A1 | 6/2008 | Badwe et al. |
| 2008/0229278 A1 | 9/2008 | Liu et al. |
| 2008/0244557 A1 | 10/2008 | Yeung et al. |
| 2008/0263505 A1 | 10/2008 | St. Clair et al. |
| 2008/0270981 A1 | 10/2008 | Hutchison et al. |
| 2009/0031286 A1 | 1/2009 | Yee et al. |
| 2009/0037912 A1 | 2/2009 | Stoitsev et al. |
| 2009/0119779 A1 | 5/2009 | Dean et al. |
| 2009/0259985 A1 | 10/2009 | Knutson et al. |
| 2009/0271319 A1 | 10/2009 | Bromley et al. |
| 2009/0271760 A1 | 10/2009 | Ellinger |
| 2010/0169862 A1 | 7/2010 | Wolf et al. |
| 2010/0180258 A1 | 7/2010 | Takahashi |
| 2010/0228683 A1 | 9/2010 | Ansley et al. |
| 2010/0251379 A1 | 9/2010 | Myers et al. |
| 2010/0269095 A1 | 10/2010 | King et al. |
| 2010/0313179 A1 | 12/2010 | Groves et al. |
| 2011/0066420 A1 | 3/2011 | Bassin et al. |
| 2011/0088014 A1 | 4/2011 | Becker et al. |
| 2011/0131134 A1 | 6/2011 | Ferris et al. |
| 2011/0131315 A1 | 6/2011 | Ferris et al. |
| 2011/0138358 A1 | 6/2011 | Rau et al. |
| 2011/0154378 A1 | 6/2011 | Kishan et al. |
| 2011/0239227 A1 | 9/2011 | Schaefer et al. |
| 2011/0246540 A1 | 10/2011 | Salman et al. |
| 2011/0264649 A1 | 10/2011 | Hsiao et al. |
| 2011/0295701 A1 | 12/2011 | Phan |
| 2012/0005209 A1 | 1/2012 | Rinearson et al. |
| 2012/0005692 A1 | 1/2012 | Bulko et al. |
| 2012/0011455 A1 | 1/2012 | Subramanian et al. |
| 2012/0054250 A1 | 3/2012 | Williams et al. |
| 2012/0158527 A1 | 6/2012 | Cannelongo et al. |
| 2012/0158669 A1 | 6/2012 | Morsi et al. |
| 2012/0159441 A1* | 6/2012 | Ghaisas ................. 717/123 |
| 2012/0174194 A1 | 7/2012 | Furukawa |
| 2012/0210243 A1 | 8/2012 | Uhma et al. |
| 2012/0246609 A1 | 9/2012 | Boden et al. |
| 2012/0246611 A1 | 9/2012 | Sawant et al. |
| 2012/0291010 A1 | 11/2012 | Hutchison et al. |
| 2012/0304248 A1 | 11/2012 | Watts et al. |
| 2012/0311003 A1 | 12/2012 | Kuznetsov et al. |
| 2013/0024847 A1 | 1/2013 | Browne et al. |
| 2013/0061200 A1 | 3/2013 | Roberts et al. |
| 2013/0216205 A1 | 8/2013 | Suri et al. |
| 2013/0326637 A1 | 12/2013 | Fang et al. |
| 2014/0013440 A1 | 1/2014 | Thakur et al. |
| 2014/0053127 A1 | 2/2014 | Madison et al. |
| 2014/0123107 A1 | 5/2014 | Rajagopalan |
| 2014/0201704 A1 | 7/2014 | Boden et al. |
| 2015/0020053 A1 | 1/2015 | Boden et al. |

FOREIGN PATENT DOCUMENTS

| | | |
|---|---|---|
| JP | 2006195529 A | 7/2006 |
| KR | 823227 B1 | 4/2008 |
| WO | 2011031328 A2 | 3/2011 |

OTHER PUBLICATIONS

L. Chung et al., "On Non-Functional Requirements in Software Engineering," Lecture Notes in Computer Science, v.5600, pp. 363-379, 2009.

IBM, "Method and System for Dynamically Unloading and Loading Software Applications from a Peer-to-Peer Platform", IP.com IPCOM000193302D, Feb. 18, 2010, pp. 1-3.

Anonymous, "Standardization for the Configuration of Heterogeneous Platforms Through Schema-Based Platform Tag Definitions", IP.com IPCOM000020720D, Dec. 10, 2003, pp. 1-5.

Huaikou Miao et al., "An Approach to Generating Test Cases for Testing Component-based Web Applications,"; Workshop on Intelligent Information Technology Application, Dec. 2-3, 2007, p. 264-269.

Yara, P, et al. "Global Software Development with Cloud Platforms", Gotel, O. et al. (eds): Seafood 2009, LNBIP 35, pp. 81-95, 2009.

Wei Yu, "Refactoring Use Case Models on Episodes," Thesis, Dept. of Computer Science, Concordia Univ., Montreal, Quebec, Mar. 2004.

(56) References Cited

OTHER PUBLICATIONS

International Search Report and Written Opinion: International Application No. PCT/IB2014/058076, International filing date: Jan. 6, 2014; Date of mailing Apr. 21, 2014.

Leffingwell, "A Rally Software Development Corporation Whitepaper - Agile Software Development with Verification and Validation in . . . "; 2011, [retrieved Feb. 3, 2015]; retrieved fm internet <URL:http://www.ultertechnologies.com/docs/agile.pdf> 33 pgs.

International Search Report and Written Opinion: International Application No. PCT/IB2014/058076, International filed: Jan. 6, 2014; Date of mailing Apr. 21, 2014.

European Examination Report for Application No. EP10776347.6—1957, dated Oct. 3, 2014, 6 pgs.

* cited by examiner noun, draft email
verb, create, list, view, move, send_,
 archive, delete, print,
 attach, unattach
ifc, browser
platform, all_email_env

400

FIG. 4 sym, send,              send, send /w attachments,
                        send high priority, send /w nocopy
sym, IE,                IE5.01,IE5.5,IE6.0,IE7,IE8,IE9
sym, apple_env,         MacOS_
sym, google_env,        Chrome, Android
sym, ms_env,            winXP, Vista_, win7, IE_
sym, all_email_env,     apple_env, google_env, ms_env

600 filter, platform.startswith('win'), changed   ; matches all platform names
                                              ; beginning with 'win' filter, platform.endswith('64 bit'), future   ; cks right end of string filter, 'Agent' in platform, new              ; find a substring anywhere
                                              ; in a string filter, 'Agent' not in platform, new          ; true if substring is
                                              ; not in a string filter, verb in new_verb, new                 ; ck if a verb is in a list
                                              ; of values. new_verb is
                                              ; a sym.

FIG. 6

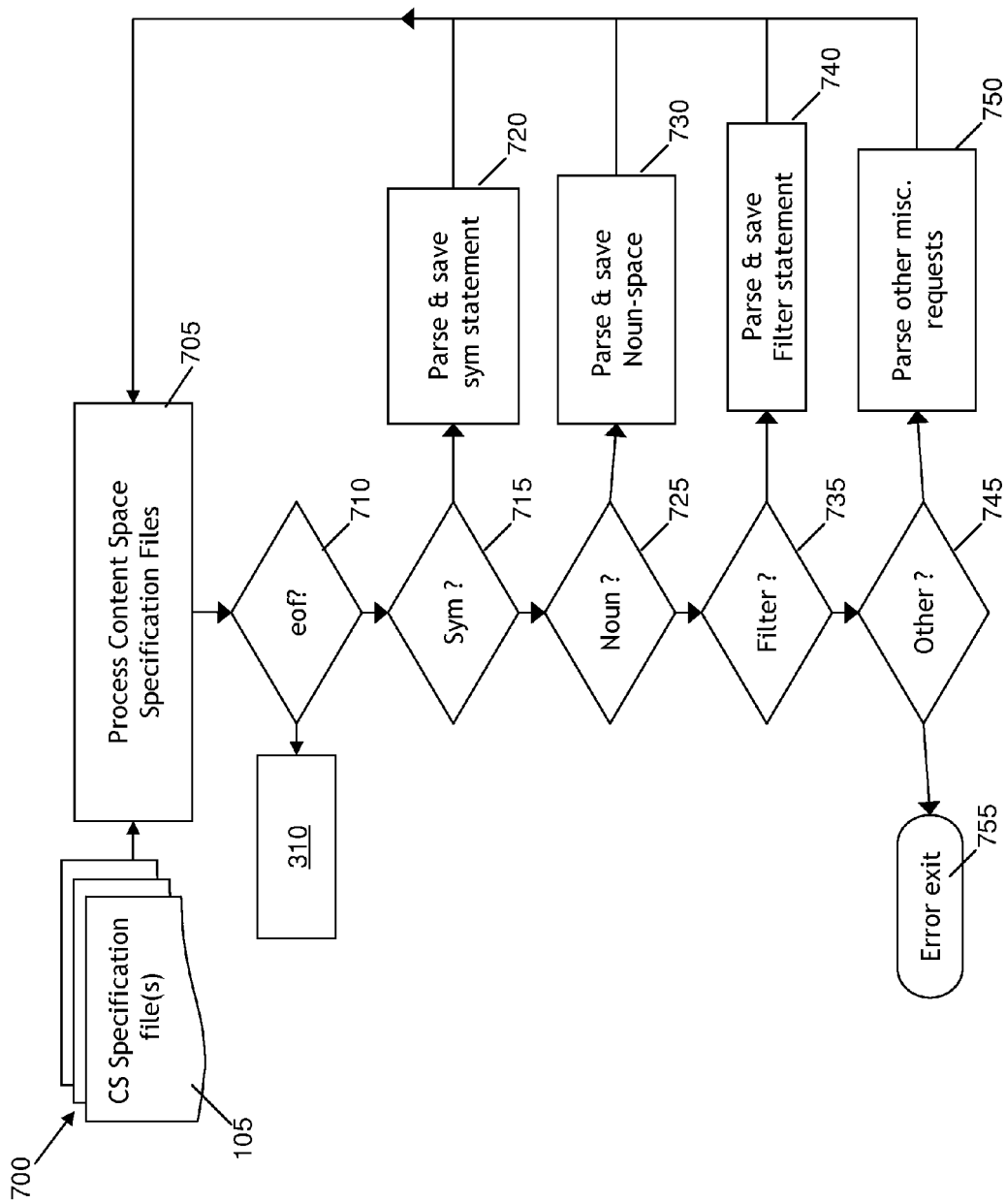

AUTOMATIC GENERATION OF USER STORIES FOR SOFTWARE PRODUCTS VIA A PRODUCT CONTENT SPACE

CROSS-REFERENCE TO RELATED APPLICATION

This application is a continuation of U.S. patent application Ser. No. 13/070,675, filed Mar. 24, 2011, the disclosure of which is incorporated by reference herein in its entirety.

BACKGROUND

The present invention relates to software development, and more specifically, to automatically generating user stories for software products.

As part of developing products and applications, particularly software products and applications, requirements are determined, usually from a wide variety of sources, such as stake-holders, strategy people, customers, marketing, industry trends, standards organizations, and more. Through various channels, a detailed technical plan of activities for the software development team is derived from the requirements, which can interact in complex ways. The process of generating detailed implementation plans from requirements is subject to errors from various sources. Multiple concurrent dialogs among teams, making assumptions and decisions in parallel, can propagate errors, which can become built into the project plans and the product architecture and or designs. As such, business results such as time to market, development cost, product viability to compete in the marketplace, and the like can affected.

Use cases have long been implemented to organize and itemize requirements for software products or application software. Use cases bridge the gap between business and market knowledge, and system design, by focusing on the user interactions with the system. The breakdown of requirements into use case or line items frequently occurs in parallel with, and is in dialog with, the architects and design leaders. During the time frame that requirements are collected and analyzed, the requirements are subject to change which must be reflected in the line items or use cases. In addition, new requirements are brought up and must be analyzed and fit with the existing line items or use cases. Some requirements are eliminated, with corresponding impacts on line items or use cases. Use cases continue to have problems of various kinds such as questions of completeness, understandability, uniqueness and manageability. What is needed is a method for generating user stories that leads to less rework, accelerated delivery and better business value.

SUMMARY

Exemplary embodiments include a computer-implemented method for generating agile user stories, the method including collecting, by a processor, a plurality of requirements, creating, by the processor, a plurality of content space specification files that includes the plurality of requirements, processing, by the processor, the plurality of content space specification files to generate the user stories and outputting, by the processor, the user stories.

Further exemplary embodiments include a computer-implemented method for generating agile user stories, the method including collecting a plurality of requirements, defining a content space including a plurality of cells, each cell defining an agile user story, each cell having a plurality of dimensions, creating a plurality of content space specification files that includes the plurality of requirements, traversing at least one dimension of each of the plurality of cells to generate a user story and generating reports defining each of the agile user stories.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 4 illustrates an example of a noun space definition in accordance with exemplary embodiments;

FIG. 5 illustrates an example of symbol definitions in accordance with exemplary embodiments.

FIG. 6 illustrates examples of filter statements in accordance with exemplary embodiments;

FIG. 7 illustrates a flow chart of a method for loading the content space from specification files in accordance with exemplary embodiments;

DETAILED DESCRIPTION

Figure 1:
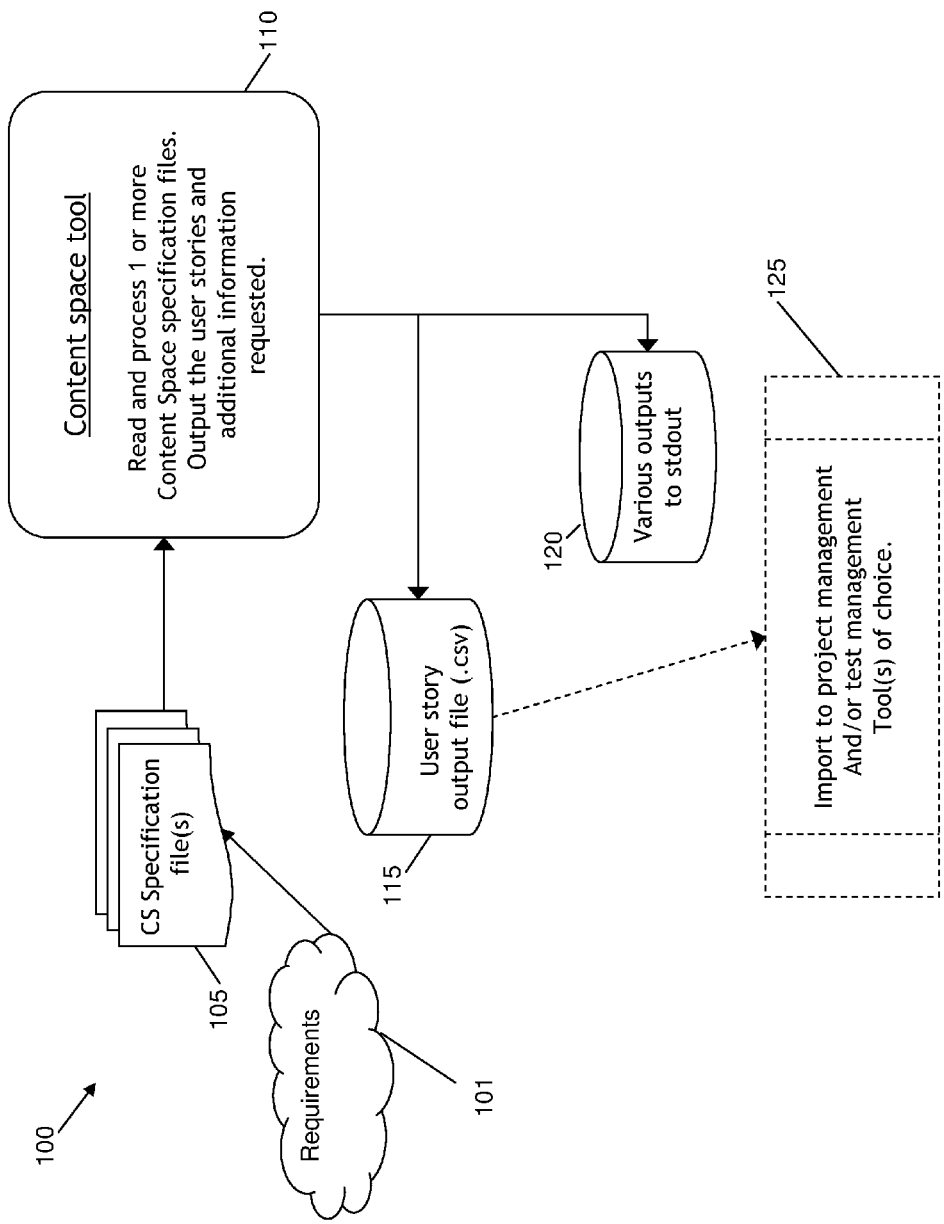
FIG. 1 illustrates a high level block diagram of a system for automatically generating agile user stories in software development in accordance with exemplary embodiments.

Exemplary embodiments include systems and methods for automatically generating end-to-end use cases (i.e., agile user stories) from requirements such that the set of generated use cases is complete (i.e., fully addresses all requirements, including some future requirements) and non-overlapping (i.e., every user story is assured to be distinct from all others). In addition, the relative size and scope of user stories is adjustable to fit the needs of project management, planning, team focus, and the like.

Typically, a software development project is broken down into 'line items' or 'use cases', which are derived informally from requirements. This process of decomposition of requirements into line items or use cases is manual and labor intensive, requiring the expertise of technical leaders, project managers and the development people. The line items or use cases are then further decomposed into smaller and smaller units of schedulable work that can be assigned to individuals on the development team. The exemplary systems and methods described herein automatically generate the line items or use cases themselves, based on requirements. The term 'user story' is used for the line items or use cases. Typical problems associated with software product and development team requirements include, but are not limited to: 1) requirements from various sources; 2) overlapping requirements; 3) requirements interactions; 4) requirements not addressing entire scope of problem; 5) requirements hierarchy; 6) parallel teams doing requirement breakdown; 7) changing requirements; and 8) requirements timelines.

After the list of line items or use cases is obtained, the key questions about them can be difficult to answer. Inquiries about line items or use cases can include but are not limited to: 1) whether or not the list of use cases is complete and whether it represents everything needed for a given release, and covers all implicit requirements; 2) whether there are gaps in the list of line items or use cases, that is, areas where some requirement possibly exists, or is assumed to exist, and yet is uncovered by any line item or use case; 3) whether all requirements are represented and expressed in the use cases; and 4) how the design is broken up, that is by use case, by requirement and the like.

In exemplary embodiments, the systems and methods described herein servers to bridge the requirements domain and the implementation (development) domain. Requirements involve marketing, existing customers, product owners, strategists, standards organizations, etc. The implementation domain consists of technical architects, technical leaders, project managers, developers, information development, test organizations, and the like. The exemplary systems and methods systematically organize the dialogue between the groups, and automate the generation of agile user stories. The generated user stories then define software product release content and can directly be used in various project management tools, as further described herein.

In exemplary embodiments, a five-dimensional space, termed either as a 'software product content space' or a 'content space' is defined such that each cell within the content space is an end-to-end use case (i.e., agile user story). In exemplary embodiments, the systems and methods described herein can be implemented at various levels of scale, from individual software components to very large products comprising hundreds of components. The five dimensions structure the work as needed by software development (i.e., design, test, project management), and the requirements serve to define the values used on the dimensions. As such, the exemplary content space servers to bridge the requirements domain and implementation domain.

FIG. 1 illustrates a high level block diagram of a system 100 for automatically generating agile user stories in software development in accordance with exemplary embodiments. The system 100 outlines and overviews the exemplary methods, the blocks for which are described further herein. It will be appreciated that each of the summary details described herein includes multiple users from each of the two domains, with multiple reviews. The order in which the individual steps are executed is not necessarily serial. Changes in requirements or additional insights happen during a later step can necessitate reworking the results from an earlier step.

In exemplary embodiments, content space (CS) specification files 105 are generated from the various sources in the requirements domain as described herein. As described further herein, the content space specification files are generated from various requirements 101. A content space tool 110 receives the content specification files 105 to automatically generate the agile user stories that can be stored in a user story storage medium 115. An additional storage medium 120 can be implemented to store changes to the specification files 105, or any other suitable output during the content space generation. Once generated, the agile user stories can be output to any suitable project management or test management tool 125 implemented by the users in the development domain.

The system 100 includes several functions, including, but not limited to: 1) articulating the content space; 2) classifying regions of the content space; 3) grouping the regions of the content space; 4) assigning priorities to use cases; and 5) loading the project management tool.

In articulating the content space, requirements are analyzed in terms of the five content space dimensions. This analysis results in (with iteration and consensus building) a definition of values for each of the five dimensions, which is represented in a form that can be programmatically processed. In articulating the content space, the systems and methods described herein address whether all the requirements are represented in the content space, whether each content space dimension value is properly defined and agreed upon, and whether all the dimension values are related to explicit, implicit or future requirements.

In classifying the regions of the content space, once the team is satisfied that the content space is defined (i.e., all dimension values known, understood, and reasonably well-defined) and that it does encompass all the requirements for a selected time-frame, the team next decides on how to classify regions of the content space. Through automated systems with team decisions, every cell in the content space is categorized in a variety of types, including, but not limited to: 1) does not apply to the product; 2) does apply to the product but for some future release; 3) is part of the product today (or from some prior release) and has no enhancements or changes; 4) is part of the product today and is enhanced or changed in some way; and 5) is a new or an enhanced function. The systems and methods described herein determine whether each content space dimension value is classified, and reviews of the results determine correctness.

Following agreement on the content space and categorization of regions, the content space regions are then grouped. Subsets of the content space are grouped together into a size which is desirable for project management and the scale of the product and teams. This step applies particularly to the content space regions classified as unchanged and new or enhanced (changed). The two extremes are; an entire content space can grouped into a single output project management work item, or at the other extreme every single content space cell can be output as a single project management line item. Essentially every possible grouping in between these extremes is also supported. Typically used are grouping all new & changed user stories for a particular platform or grouping specific sub-variations of a verb.

In exemplary embodiments, there is flexibility in how these regions are selected and how they related to the content space cell classifications. The systems and methods described herein determine whether the grouping is correct and do the groupings properly reflect the tradeoff between project management needs and technical visibility based on classifications and complexity.

The grouping of content space cells into right sized project management work items mostly focused on a new function and an existing and unchanged function. The user (team) can programmatically select the grouping of content space cells based on many considerations such overall content space size, product size, degree of technical difficulty of new function, team size, number of team, and the like. In exemplary embodiments, individual content cells are use cases (with adjustable granularity) and the groupings are user functions or user stories.

Based on the relative priorities of requirements, regions of the content space (subsets of use cases) are assigned priority values. These can be used to help focus review sessions to ensure the right higher priority content is defined. When loaded into a project management application, the priorities can be used directly by development in Agile sprint (iteration) planning. The output project management work items are input (e.g. 'import') for example, from the user story storage medium 115, into an appropriate project management tool 125.

As described herein, a content space is defined by five dimensions. In exemplary embodiments, the five dimensions of the content space are, in order: release (time); noun; verb; interface; and platform. The three dimensions, verb, interface and platform, are orthogonal and noun-specific. That is, an instance of these (e.g. a verb set, an interface set and a platform set) is defined for each noun of interest. Nouns are the fourth dimension. The combination of a noun and its associated 3D space is termed a 'noun space'. A set of noun spaces at a given point in time (usually associated with product release) constitute the definition of the content space for a particular release of a product (when the point in time is chosen on a release calendar boundary). Instances a product content space for multiple releases represent the fifth dimension of content space: time.

Figure 2:
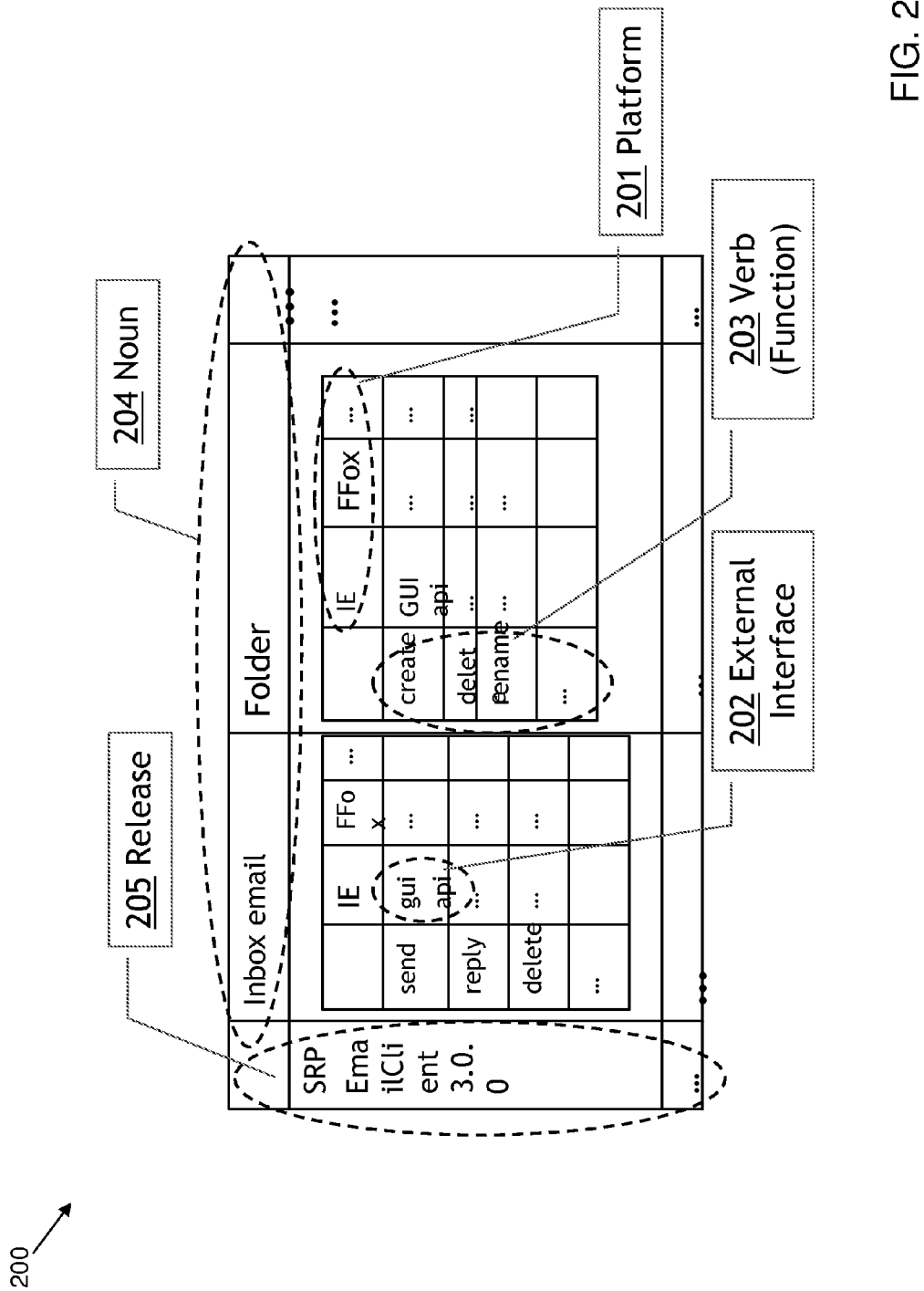
FIG. 2 illustrates a chart representation of five exemplary dimensions of a content space.

For illustrative purposes, an example of a software product, a hypothetical browser-based email client is discussed for ease of discussion. It will be appreciated that other products are contemplated FIG. 2 illustrates a chart representation of the five exemplary dimensions described herein. As described herein, the five dimensions of the content space are, from inner three to out-most: platform 201; interface 202; verb 203; noun 204; and release (time) 205. All of the values for the dimensions are derived from the product requirements, either explicit or implicit.

The platform dimension 201 is interpreted broadly to include the hardware, operating system, middle ware, hypervisor, and language runtime in which the product executes. Generally, meaningful platform elements are determined by each product. As such, the entire prerequisite software stack and hardware is considered. Values of the platform dimension 201 can include specific releases of each of these platform components as needed, or can be more generally specified. For example, a platform might be AIX 5.2 or just AIX. Or it might be Firefox 3.6 or better, or just Firefox. Values can include as needed ancillary hardware for storage, networking, hardware management controllers, firmware, etc. for the full functional system configuration.

The interface dimension 202 has values chosen to identify and separate the kinds of interfaces that the subject software presents to external entities; people, other software or hardware. The values can be specified by type such as Graphical User Interface (GUI), command line interface (CLI), and so on. The values can include programmable interfaces such as web services (e.g. REST) and APIs. Protocols can also be specified as values (e.g. IPv6 or MPI (Message Processing Interface) used in super-computing environments).

The verb dimension 203 includes values such as functions or operations that are supported by the subject software for a particular noun. The operations may be specified at varying levels of granularity, depending upon the needs of a given set of requirements. For example 'copy' or 'create' might be sufficient. More fine-grained values such 'copy to like repository' and 'copy to new folder' can also be used. The decision depends on considerations like how new the function is, or how critical the different forms of copy are to the product stake-holders (those that define requirements), or how technically difficult to implement.

The noun dimension 204 is an abstract entity presented to externals via the interface(s). Most software for direct use by people has a number of such abstractions that people manipulate via the functions (verbs) presented by the software. Example nouns for an email client can include but are not limited to: inbox; inbox email; folder; and draft email. As with values on the above dimensions, there is flexibility in how coarse-grained or fine-grained the nouns are defined. The right level of noun dimension granularity for a given product and given release depends on the requirements.

The time dimension 205 values include natural values (i.e., discrete units) which are the releases planned for the product. The content space for release n+1 can be various additions and changes relative to the release n content space. These additions, enhancements and other changes affect the release n content space by changing the values defined on the various dimensions. New nouns, new verbs, new platforms, can all be added. Enhancements to exiting nouns and verbs are common are defined explicitly in the n+1 content space.

Because of the way the dimensions are defined, each generated user story is an end-to-end testable unit of function (sometimes termed 'FVT-able', where FVT=Function Verification Test). For example, for an "email" client each user story is a cell in the five-dimensional space with coordinates of release, noun, verb, interface and platform. For example, "send an email on Firefox via GUI release n" is represented by a 5-tuple {release n, email, send, GUI, Firefox}, as shown in FIG. 2.

Figure 3:
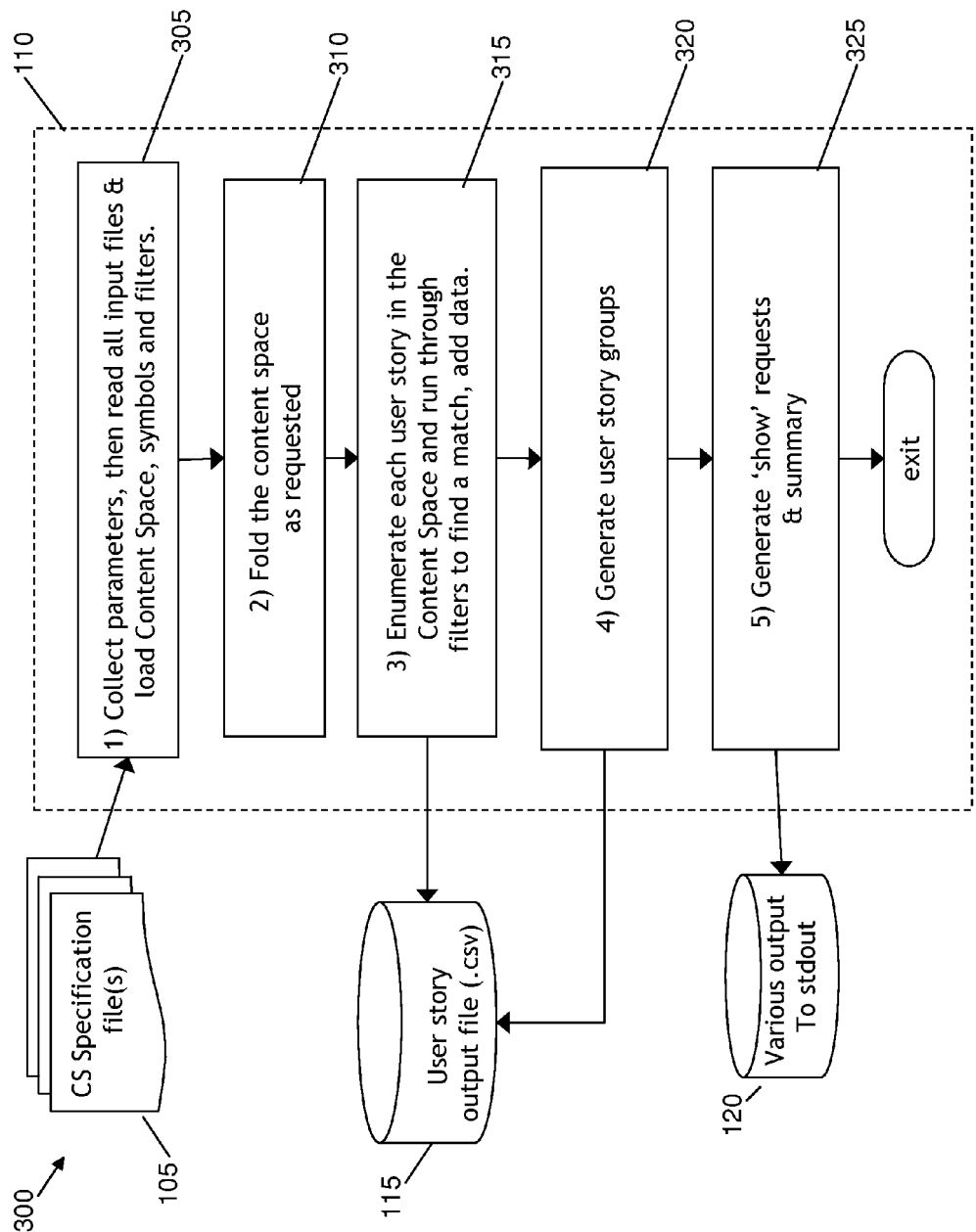
FIG. 3 illustrates the system for automatically generating agile user stories in software of FIG. 1, further illustrating an exemplary content space tool process flow.

FIG. 3 illustrates the system 100 for automatically generating agile user stories in software of FIG. 1, further illustrating the content space tool 110 process flow. In exemplary embodiments, parameters are collected from the content space specification files 105 at block 305. In addition, any input files and content space symbols and filters are also read into the content space tool 110. As such, following invocation and initialization of the content space tool 110, the content space specification file(s) 105 are read. In addition, the content space specification file 105 are parsed for correctness and various checks are run to help ensure consistency across the possibly multiple files. This processing includes all the symbols and filters. At block 310, the content space is folded as further described herein. At block 315, each user story is enumerated in the content space and run through filters to classify and possibly add data. At block 320, the user story groups are generated and at block 325 show requests and a summary are generated. Each of the blocks 305, 310, 315, 320, 325 are described further herein.

In exemplary embodiments, a content space is specified in a form that is processed (read) by the content space tool 110 (e.g., an Agile user story generation program). The specification can be split among multiple files (e.g., the content space specification files 105), which can be processed individually or together. As such, an overall product content space can be split among some number of individual architects for parallel concurrent activity, and then processed as a whole.

In exemplary embodiments, each content space specification file 105 includes some number of noun spaces, defined symbols, and filters. A content space specification file is used to define a content space in a form that can be processed programmatically. In exemplary embodiments, the specification is implemented to generate user stories and provide various kinds of statistics about the content space, enables content coverage metric, automated comparisons of multiple content spaces (e.g. cross-release), and the like. In exemplary embodiments, the content space specification file 105 includes several statements, which define, among other things, a noun space, that can include noun, verb, interface (ifc) and platform. A content space is a set of noun spaces. As such, a basic content space specification file defines one or more noun spaces. Descriptive names are used for the values on all these dimensions. In exemplary embodiments, additional statements can be added to the content space specification file 105. On statement is symbol (SYM) to simplify maintenance of the content space specification file 105 by reducing redundancy across noun space definitions. Another statement is a filter statement that is used to classify user stories, and to add information to output user stories. In exemplary embodiments, each instance of statements as a group, defines a single noun space. For example, the noun statement gives the noun space a name, and the other verb, interface and platform statements provide the values for which each dimension is named. FIG. 4 illustrates an example of a noun space definition 400 in accordance with exemplary embodiments.

As further described herein, a sym statement is a simple mechanism to create a short-hand for a list of values. The short-hand can then be used in defining noun spaces (e.g. in 'noun', 'verb', 'ifc', 'platform' statements), in other sym statements, and in filter statements. This implementation of sym statements therefore simplifies use and later changes to the content specification file since the list of related values can reliably changed throughout a set of specification files by changing it in only a single place. For example, assume a content space has 15 noun spaces and 12 of those all use the same platform list. Then that list can defined once as a sym and that sym name used in the 12 noun spaces. FIG. 5 illustrates an example of a symbol definition 500 in accordance with exemplary embodiments. The example illustrates a group of related syms that aggregates various example platforms. The sym 'all email env' is then used to in the definition of various noun spaces, for example in the 'draft email' noun space shown in FIG. 4.

The symbols in FIG. 5 that end in a trailing '_' (underbar) are fold syms, as is the 'send_' in FIG. 4. The '_' indicates a symbol that can be folded. If the relevant type of value folding is requested (e.g. verb value to fold verb dimension, or platform value to fold platform dimension) then the symbols marked with a trailing '_' are folded. That is, the symbol itself is used in the content space when folded. If not folded the symbol's value list is used in the content space. When folded a symbol is shown in generated user stories with the trailing '_' so that everyone seeing the user story will know it is folded (is an abstraction).

As further described herein, filter statements are used to classify user stories into one of five categories; n/a, future, nochange, changed or new. They also can add to a story a variety of information. A filter statement has the general structure: filter, <expression>, <classification>, <other requests>. The filter expression is a logical expression (i.e., evaluates to True or False) based on the language of the content the content space tool 110. For example, logical operators are supported (i.e., =, !=, >, <, in, not in, etc.) and the variables allowed are 'noun', 'verb', 'ifc', 'platform' and defined symbols (sym's). FIG. 6 illustrates examples of filter statements 600. Other keyword-value pairs which may be included in a filter statement include but are not limited to: 1) Owner, owner name; 2) Group or Groupby request; 3) Priority, priority value; 3) Testid, testid value; and 4) Tag, list of tag values. By default, filtering is done after all the content space specification files 105 have been read and after folding is performed. The content space tool 110 has an option to turn off all filtering which is useful at time to check the results of content space changes.

In exemplary embodiments, the content space specification files 105 can implement additional statements, including, but not limited to: 1) comment_off—used to end commented-out block of lines; 2) comment_on—used to start a block of comment lines. Starts skipping; 3) createdby—used to set the field 'Created By'; 4) csvfile—sets the name of the output .csv file; 5) eof—logically ends file early (rest of file skipped); 6) include—name a file to be included; 7) plannedfor—used to set the RTC field 'Planned For'; 8) scope—used to set filter scope to file (default) or global; 9) set_filterid_in_summaryfield—true or false (default); 10) set_implicit_folding—true or false (default); 11) set_summary_prefix—Default is "User Story"; 12) set_summary_suffix—Default is category of the user story; 13) tag_exclusion_set—Define a mutually exclusive set of tags; and 14) title—title (label) of content space.

As described herein, the specification supports the definition of symbols used in the defining the values and in the filters, that is, used within the content space specification file itself. This format helps maintain a content space specification by lessening duplication of constants (i.e., dimension values). This format also serves to help the specification file be self-documenting when description names are used for the symbols. For example, a list of platforms used in a prior release might be assigned to a symbol named 'prior_platforms'. This symbol is then used in the noun spaces as a short-hand for the full list. This symbol can also be used in the filters.

Each use case in a content space is classified using filters into basic categories including, but not limited to: not applicable, future, regression and development. "Not applicable" are use cases judged to likely never be relevant for the product and future are use cases not in the n+1 release but inherent in the content space. In exemplary embodiments, the content space is identified to clearly encompass the requirements to help ensure nothing is missed. In doing so, some use cases are likely to be generated that are not planned for the current release.

In exemplary embodiments, filters are also implemented to add information to the generated use cases. Examples of information that can be added are priority, tags, references to requirements document and the like.

In exemplary embodiments, filters are also implemented to cause sets of use cases to be grouped into a single, broader output use case. Implementing filters in this manner can be helpful in the case regression use cases where fine-grained management and tracking of the individual use cases is not necessary (e.g., due to the existence of automated testing built during previous releases).

In generating the agile use cases, one or more content space specification files 105 are read by the content space tool 110. As described herein, a primary output is the user story storage medium 115. In exemplary embodiments, the user story storage medium can have a comma separated value (.csv) file format, which is a quasi-standard widely used by many software applications. A second type of output is the additional storage medium 120 for various summary and report like information or in progress changes.

FIG. 7 illustrates a flow chart of a method 700 for loading the content space from specification files 105 in accordance with exemplary embodiments, and as shown in block 305 of FIG. 3. At block 705, the content space tool 110 collects parameters related to loading the content space specification files 105, and reads one or more of the content space specification files 105. The content space tool 110 reads each line in the content space specification files 105 for specification statement and processes each statement as found, as now described. At block 710, the content space tool 110 determines if the line is an end of file (EOF). If the line is EOF at block 710, then the space content tool 110 continues at block 310 as illustrated in FIG. 3. If the line is not EOF at block 710, then at block 715, the content space tool 110 determines if the line is a symbol line statement (SYM). If the line is a SYM at block 715, then at block 720, the content tool 110 parses and saves the SYM and reads the next line at block 705. If the line is not a SYM at block 715, then at block 725, the content space tool 110 determines if the line is a noun. If the line is a noun at block 725, then at block 730, the content tool 110 parses and saves the noun and reads the next line at block 705. If the line is not a noun at block 725, then at block 735, the content space tool 110 determines if the line is a filter statement. If the line is a filter statement at block 735, then at block 740, the content tool 110 parses and saves the noun and reads the next line at block 705. If the line is not a filter statement at block 735, then at block 745, the content space tool 110 determines if the line is any other miscellaneous request within the content space specification files 105. If the line is another miscellaneous request at block 755, then at block 750, the content tool 110 parses and saves the request and reads the next line at block 705. If the line is not another miscellaneous request at block 745, then at block 745, the content space tool 110 determines that the line is an error and exits.

Figure 8:
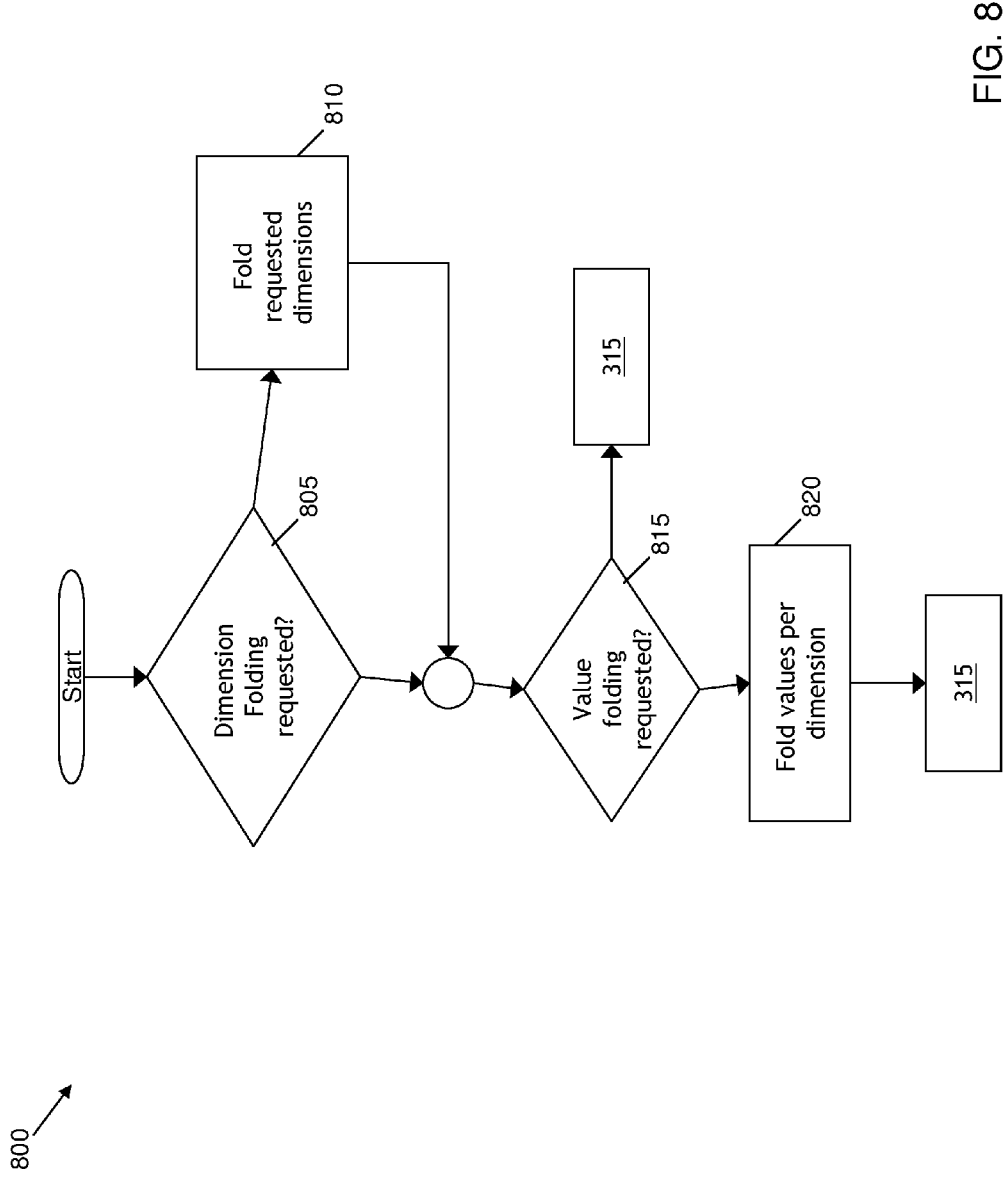
FIG. 8 illustrates a flow chart of a method for folding the content space in accordance with exemplary embodiments.

FIG. 8 illustrates a flow chart of a method 800 for folding the content space in accordance with exemplary embodiments, and as shown in block 310 of FIG. 3. At block 805, the content space tool 110 determines whether dimension folding is requested. If dimension folding is requested at block 805, then the content space tool 110 folds the dimension as described further herein. If dimension folding is not requested at block 805, then the content space tool 110 determines whether value folding is requested at block 815. If value folding is requested at block 815, then the content space tool 110 folds the value as described further herein. If value folding is not requested at block 815, then the content space tool 110 continues with block 315 as shown in FIG. 3. If value folding is requested at block 815, then the content space tool 110 folds values per dimension at block 820.

In exemplary embodiments, both grouping and folding are techniques to manage content space size. The size of a content space is naturally expressed as the number of user stories it contains, or will output if requested. For example, in software products, content space sizes in range of hundreds to over thirty million. Average sizes can be in the range of two thousand to twenty thousand. Both folding and grouping can manage content space size without eliminating detail from the content space specification files 105.

In grouping user stories, a set of user stories is represented in output as a single user story. For example all the user stories for platform ABC or for function XYZ might be represented by a single output user story. Grouping does not change the size of a content space. Grouping allows the number of output user stories to be directly managed without eliminating any details from the CS specification. There is no limit on the size of a user story group. In exemplary embodiments, grouping is controlled by the user by filters in the content space specification file 105.

As filtering occurs, when a filter matches a user story and the filter has any kind of grouping requested, save the user story is saved in a buffer associated with the filter. After all filtering and all non-grouped user stories are output. The content space tool 110 loops through all the filters that have any kind of grouping. For each filter, the content space tool performs several steps. First, if a simple 'group' is requested in the filter, the content space tool 110 generates the single grouping user story, summary field, description field, and the like, and writes to output. The content space tool 110 then continues to the next filter. If a type of 'group by' is requested, then for each group by element (e.g. noun, verb, ifc, platform), the content space tool 110 builds subsets of the respective values on the dimension from among the buffered user stories. The content space tool 110 then generates a single user story group for each cross-dimension subset, generates the description field that itemizes the subset of user stories for the group, and writes the user story group.

Folding also reduces the number of output user stories like grouping. But in contrast to grouping, folding reduces the size of the content space. Folding reduces the size of the content space by collecting some number of dimension element values into a single value. The resulting single value is then used as a dimension element value in place of the multiple collected values, thereby reducing the size of the content space. The single resulting value is termed a folding symbol ('fold sym').

As described herein, folding does not eliminate the details from the content space specification file. The values collected into a fold sym remain in the content space specification file 105, and the folding done by the fold sym can be toggled on or off. The value-folding can be switched on and off for each of the noun, verb, interface and platform dimensions independently or all 4 dimensions together. Hence not only are the values still in the spec file, but the content space can also be processed again and user stories generated without folding or different folding, to see the detail. As shown in FIG. 8, folding can include both dimension folding and value folding.

In exemplary embodiments, the content space tool 110 processes command line parameters to determine what kinds of folding are requested. If no fold parameter, the content space tool 110 implements the default setting for folding. As the content space specification files 105 are read, the content space tool 110 collects a list of all fold syms, and values for each. After all the noun spaces are read from input files, the content space tool 110 invokes a fold function. As shown in FIG. 8, the content space tool implements dimension folding first if requested. For each dimension for which folding is requested, the dimension is folded to "p" in each noun space. If value folding is requested for any dimensions that have not been folded, the following steps are implemented. If noun value folding, the content space tool 110 folds the noun values by removing nouns in value list of a fold sym and replace with single instance of the fold sym. For each (remaining) noun space, for each relevant dimension, the content space tool 110 check each dimension value to see if it is in the value list of a fold sym. If the noun is in the value list of the fold sym, then the content space tool 110 removes the value and adds the fold sym (once only) to the dimension list. If folding has been set off, the content space tool 110 takes no action. The content space by default is loaded in this mode. If fold request for the 'all' or similar, the interface and platform dimensions are folded (as above) and the verb dimension is value-folded for all noun spaces are folded, and the noun dimension is value-folded.

Figure 9:
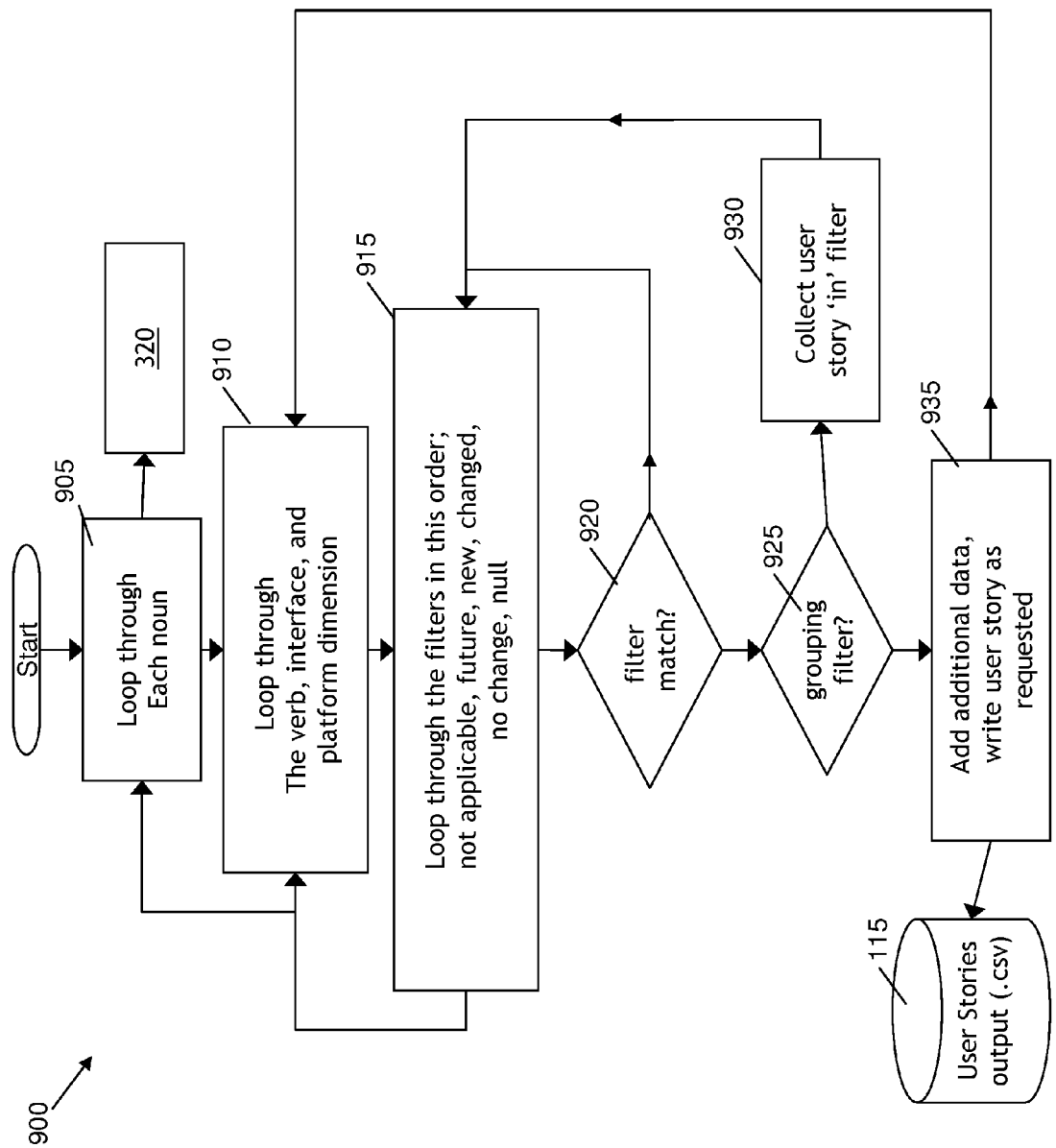
FIG. 9 illustrates a flow chart of a method for enumerating and filtering the user stories in accordance with exemplary embodiments.

FIG. 9 illustrates a flow chart of a method 900 for enumerating the user stories in accordance with exemplary embodiments, and as shown in block 315 of FIG. 3. As such, once fully loaded, the content space is traversed, one noun space at a time. For each noun space, the user stories are generated by traversing the three inner dimensions (i.e., verb, interface and platform) one value at a time, and for each value in the platform dimension creating the 3-tuple using each value on the other two dimensions. More specifically, at block 905, the content space tool 110 loops through each noun 204 in the content space. The content space tool 110 then continues at block as shown in FIG. 3. In addition, the method 900 continues at block 910, in which the content space tool 110 loops through the verb 203, interface 202 and platform 201. At block 915, the content space tool 110 loops through all filters in the content space specification file 105. In exemplary embodiments, the content space tool 110 can loop through the filters in the order: 1) not applicable; 2) future; 3) new; 4) changed; 5) no change; and 6) null. It will be appreciated that in other exemplary embodiments, other orders of filter looping are contemplated. At block 920, the content space tool determines if there is a filter match as described herein. If there is no filter match at block 920, then the content space tool 110 continues looping through the filters at block 915. If there is a filter match at block 920, then the content space tool 110 determines whether there is a grouping filter. If there is a grouping filter at block 925, then the user story is added to a group at block 930, and the content space tool continues to loop through the filters in the content space specification file 105 at block 915. If there is no grouping filter at block 925, then the content space tool 110 adds the additional data and writes the user story as requested and stores the user story in the user story storage medium 115. It is appreciated that the method 900 continues to loop at blocks 905, 910, 915 to process all nouns 204, ultimately storing a user story in the user story storage medium 115. As described herein, as each noun space is traversed, the filters are processed against the generated use case. If a filter matches, the classification and other requests in the filter are taken. In addition, counts and statistics are accumulated as the noun spaces are traversed, and the requested outputs e.g., report-like and .csv file) are written to the user story storage medium 115.

Figure 10:
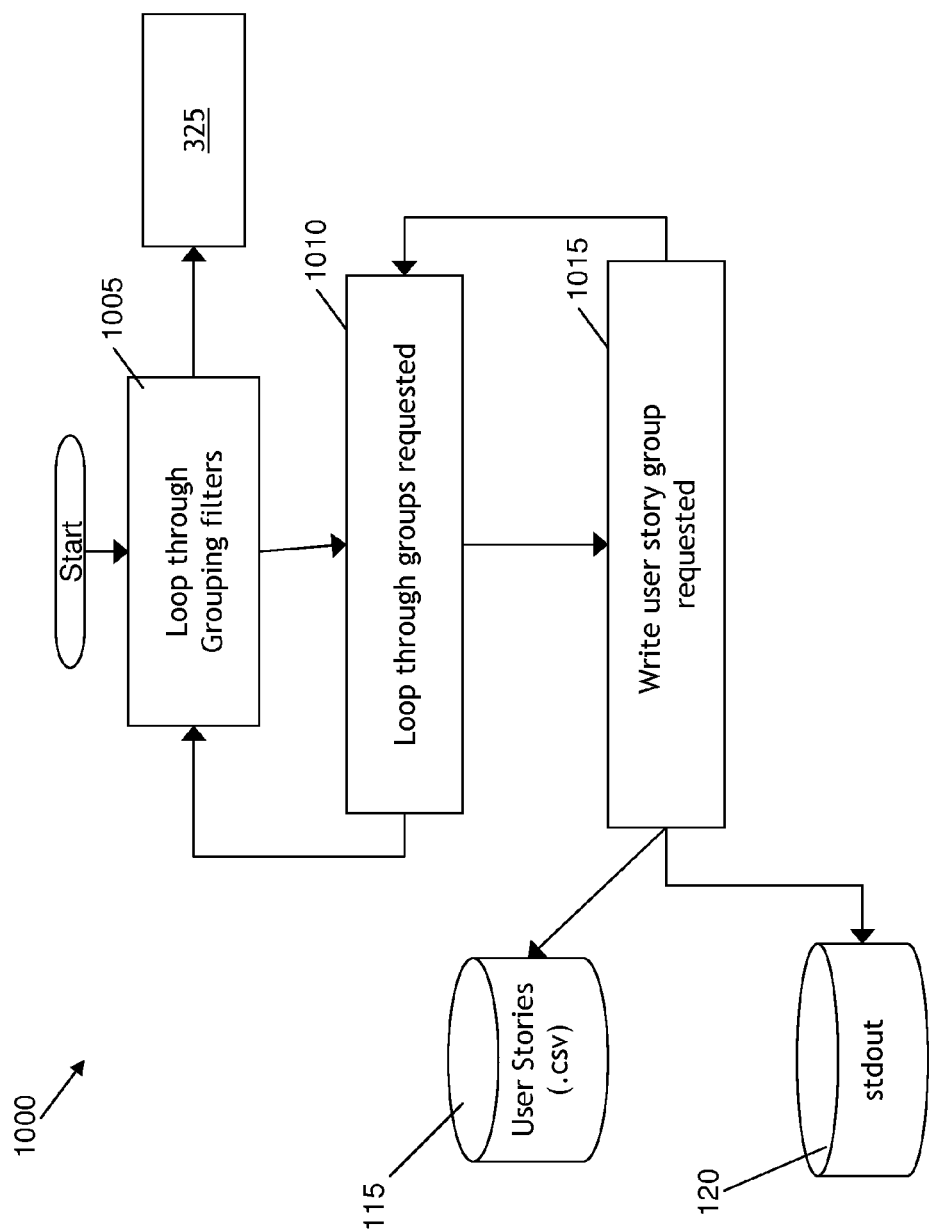
FIG. 10 illustrates a method for generating user story groups in accordance with exemplary embodiments.

As described with respect to FIG. 9, as the content space tool 110 loops through each noun 204, the content space tool 110 also continues with block 320 as shown in FIG. 3. FIG. 10 illustrates a method 1000 for generating user story groups in accordance with exemplary embodiments and as shown at block 320 in FIG. 3. At block 905, the content space tool 110 loops through grouping filters and also continues at block 325 in FIG. 3. In addition, at block 1010, the content space tool 110 loops through groups requested. At block 1015, the content space tool 110 writes the user story group requested. The content space tool also accumulates counts and statistics as the noun spaces are traversed, and the requested outputs (e.g., report-like and .csv file) are written to the additional storage mediums 120.

Figure 11:
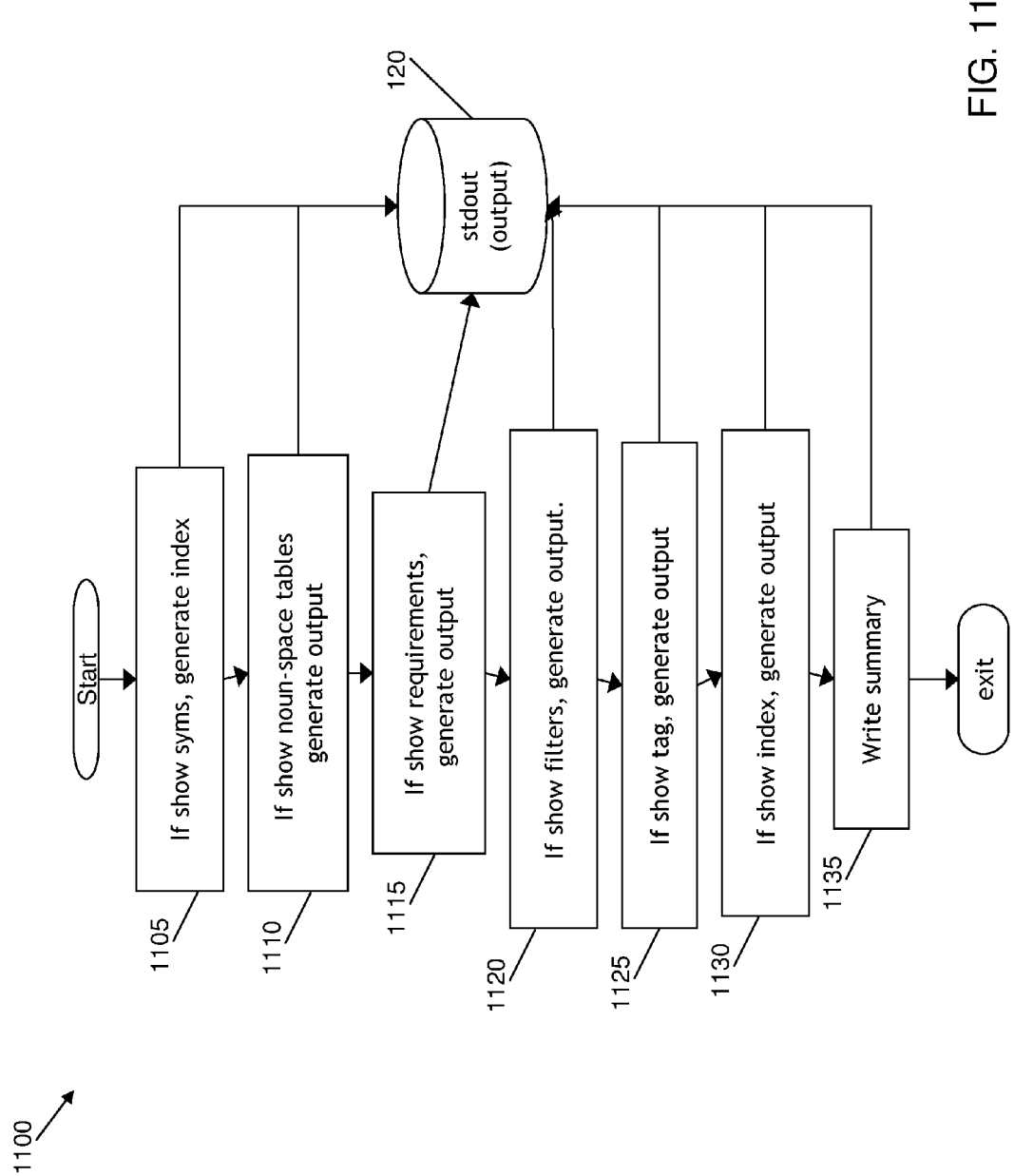
FIG. 11 illustrates a flowchart for a method of generating show requests and summary for a report in accordance with exemplary embodiments.

FIG. 11 illustrates a flowchart for a method 1100 of generating show requests and summary for a report in accordance with exemplary embodiments and as shown at block 325 in FIG. 3. As such, when the content space tool 110 completes looping all noun spaces, a report can be generated for the user stories, which can include several pieces of information. At block 1105, the content tool determines if the user has requested to show symbols in the report, and if symbols have been requested, then the request to show symbol, is stored, and an index is generated and stored in the additional storage medium 120. At block 1110, the content tool determines if the user has requested to show noun-space tables in the report, and if noun-space tables have been requested, then the request to show noun-space tables is stored in the additional storage medium 120. At block 1115, the content tool determines if the user has requested to show requirements in the report, and if requirements have been requested, then the request to show requirements is stored in the additional storage medium 120. At block 1120, the content tool determines if the user has requested to show filters in the report, and if filters have been requested, then the request to show filters is stored in the additional storage medium 120. At block 1125, the content tool determines if the user has requested to show tags in the report, and if tags have been requested, then the request to show tags is stored in the additional storage medium 120. At block 1130, the content tool determines if the user has requested to show an index in the report, and if the index has been requested, then the request to show the index is stored in the additional storage medium 120.

EXAMPLE

Referring again to FIG. 1, the exemplary content space tool 110 receives requirements 101 from various sources and automatically generates agile user stories for the software development team. The following example described herein describes a scenario in which requirements are gathered via an email, similar to the illustrative example described herein. The content space specification file 105 (spec) in the example describes a basic e-mail application that is in its second release. The first release provided support for a hypothetical Simple Email 1.0 client from Company X, that supported basic e-mail operations via a web browser; creating a draft, view e-mail, an inbox, saving a received e-mail in a folder, and the like. Release 1.5 of Simple Email will provide the ability to print a draft e-mail and will support a new platform, the Widget browser from the company Provider. The team has also received a requirement for a new interface (Phone) that they would like to support in the future, in addition to the current browser interface. The content space (CS) specification is organized around three nouns; 'draft email', 'inbox email' and 'folder'. Each noun has a set of functions (verbs) that can be applied to nouns, using interfaces (ifc) and relevant platforms. The CS spec is below, following the steps listed next. The high level process includes the following steps: A) Edit this file to specify the content space. ';' begins a comment; B) Run the content space tool to process this file and see the generated user stories; C) Review the user stories to see if correct, properly classified and so on. If changes are needed go to step A above; and D) Import the user stories into project management & test management tool(s) of choice. In greater detail is broken into various sub-steps as follows:

A. Edit this file.
    1. Define a noun space.
      a. based on requirements, define or identify a noun, enter in spec file
      b. based on requirements, list the functions (verbs) for the noun
      c. based on requirements, list the interfaces via which a user invokes the function
      d. based on requirements, list the platforms on which the function executes
      e. repeat step 1 until all the noun space have been identified (The following steps are optional, and highly recommended.)

2. Classify the user stories as new, changed or no change.
      a. identify and filter the not applicable (n/a) stories
      b. identify and filter the future stories
      c. based on requirements, identify and filter the new stories
      d. based on requirements, identify and filter the changed stories (User stories not classified as any of above are classified as 'nochange' by default.)
3. Tie the requirements to the user stories they impact.
   a. for each new & changed filter from step 2, add tags for each requirement
4. Too much duplication of data (like platform names)? Use symbols.
   a. identify a list of values (e.g. platform values) that is used and repeated for multiple noun spaces.
   b. define a "sym" for the list
   c. replace the list in each noun space with the sym name
   d. repeat step 4 as needed
5. Too many complicated symbols? Use combination symbols.
   a. identify a list of symbols with a regular pattern. E.g. browser1 via HTTP, browser1 via HTTPS, browser2 . . . , etc.
   b. define a sym for list which generates the combinations
   c. replace the list with the sym name everywhere it is used
   d. repeat step 5 as needed
6. What to do if there are too many requirements, or the product big.
   a. partition the set of nouns
   b. use include files, subset of nouns in each file
   c. use a default input file
   d. use common symbols
7. Too many user stories? Use grouping and keep details visible.
8. Use content space to generate test cases.
9. Way too many user stories? Use folding to abstract the content space.
   a. decide on what basic of type folding is needed.
      1. dimension folding
      2. value folding
   b. for value-folding, define fold symbols
   c. consider using folding to balance scope across noun spaces.
10. Other information you can add to user stories.
    a. tags
    b. owner
    c. priority
11. Additional filtering ability
    a. How to simply avoid over classifications?
    b. How to simply check what folding is 'set'?
12. (Protect your investment; use a source code management tool to store the specification files.)
B. Run the content space tool.
1. Install the content space tool and prerequisites.
2. Use 'help' on tool invocation (command line) to see help text and verify installation.
3. Use 'file' option select this file as input. Other options default.
   (The following steps are optional.)
4. Use folding options to see how the quantity of user stories changes.
   a. use options to request the desired type of folding
   b. check other folding options to verify desirable results.
5. Check to see how requirements map to the user stories.
6. Generate an output .csv file for spreadsheet and/or Project Management tools.
7. Use the tool to help estimate test content coverage metric.
   a. create a tag exclusion set
   b. add tags
   C. use show tag with '%' to see metric estimate per noun space
8. Turn off grouping to see the effect on user stories without editing.
9. Use the tool to compare two content spaces.
   a. Use the direct comparison function in the tool to get summary compare.
   b. Use ancillary tools to add content coverage or development cost data to the user stories and compare results splits.
C. Review the output user stories.
1. Use spreadsheets to review the user stories.
   a. request .csv output
   b. import .csv into Lotus Symphony or other spreadsheet tool
   c. Use column filters to view subsets of user stories, e.g. all the 'new' user stories.
   d. Use pivot tables (or similar) for the big picture
2. Use the tool to view aspect of the user stories & content space.
   a. noun space tables
   b. symbols
   c. filters
   d. requirements
   e. priority tables
   f. tags
   g. index
   h. user stories summary list
3. Individual review.
4. Review with product stakeholders, business people, product
   manager or owner, technical architects, end-user, etc.
5. Review broadly with implementation teams: Development, Test, Operations, Information development, Build, etc.
Repeat steps A, B and C until user stories are agreed-to or approved.
D. Import user stories to project management system.
1. Company X Development Team
   a. prepare a .csv file for import
   b. invoke Team's import function
2. Company X Quality Manager
   a. prepare a .csv file for import
   b. invoke Quality Manager's import function
The following content space specification is generated from the requirements, includes three nouns to define the user stories in the example.

| | | |
|---|---|---|
| ; | | |
| noun, | draft email | ; email that is just being created or is ; saved awhile before being sent. |
| verb, | create, view, send, delete, print, edit, save | ; verbs are actions with draft ; email |
| ifc, | browser | ; this is the kind of interface |
| platform, | Internet Searcher, Firefly | ; kinds of browsers supported |
| ; | | |
| noun, | inbox email | ; everyones favorite kind of email |
| verb, | view, forward, delete, print, reply, reply all, move to folder | |
| ifc, | browser,phone | |
| platform, | Internet Searcher, Firefly, widget | |
| ; | | |
| noun, | folder | ; we need a way to organize all that email |
| verb, | create, list, delete | |

-continued

```
ifc,       browser
platform,  Internet Searcher, Firefly, widget
;
```

As such, in the example, the user stories (requirements) are classified into the content space specification file 105. A first requirement can be "Let the development & test organizations know we're going to support Phone in the future." Another requirement can be "Now, make sure the new ability to print draft email is categorized as 'new'. And our software will support that new browser from Provider (Widget)." The following content space specification filters can then be created and added to the file:

```
                ; Let the development & test organization
                ; know we're going to support Phone in the future.
filter,  ifc=='phone', future
                ;Now, make sure the new ability to print draft email is
                ;categorized as 'new'.  And our software will support
                ;that new browser from Provider (widget).
filter,  verb=='print' and noun=='draft email', new
filter,  platform=='widget', new
```

As described herein, the content space specification file created in the example is processed by the content space tool 110 implementing the exemplary methods described herein to automatically generate agile user stories in a five dimensional space with corresponding summary output reports as follows:

```
number of nouns = 3
number of symbols = 5
number of fold symbols = 0
number of filter sets = 3
number of filters = 4
number of grouping filters = 0
----number of nouns (before folding) = 3
noun: draft email , (v,i,p,space) = 5 , 1 , 2 , 10     (f,f)
noun: folder , (v,i,p,space) = 3 , 1 , 3 , 9           (f,f)
noun: inbox email , (v,i,p,space) = 6 , 2 , 3 , 36     (f,f)
CS size = 55
```

In traversing the content space with filtering set 'on', the following output is generated:

```
CS & filter cross ck ok for type: nochange
CS & filter cross ck ok for type: future
CS & filter cross ck ok for type: new
CS ck Ok: cell count sum equal across dimensions.
CS ck Ok: announceable equals new + changed + nochange.
```

|  | n/a | future | nochange | changed | new |  |
|---|---|---|---|---|---|---|
| noun = draft email | 0 | 0 | 8 | 0 | 2 | 10 |
| verb create | 0 | 0 | 2 | 0 | 0 |  |
| verb delete | 0 | 0 | 2 | 0 | 0 |  |
| verb print | 0 | 0 | 0 | 0 | 2 |  |
| verb send | 0 | 0 | 2 | 0 | 0 |  |
| verb view | 0 | 0 | 2 | 0 | 0 |  |
| ifc browser | 0 | 0 | 8 | 0 | 2 |  |
| platform Firefly | 0 | 0 | 4 | 0 | 1 |  |
| platform Internet searcher | 0 | 0 | 4 | 0 | 1 |  |
| noun = folder | 0 | 0 | 6 | 0 | 3 | 9 |
| verb create | 0 | 0 | 2 | 0 | 1 |  |
| verb delete | 0 | 0 | 2 | 0 | 1 |  |
| verb list | 0 | 0 | 2 | 0 | 1 |  |
| ifc browser | 0 | 0 | 6 | 0 | 3 |  |
| platform widget | 0 | 0 | 0 | 0 | 3 |  |
| platform Firefly | 0 | 0 | 3 | 0 | 0 |  |
| platform Internet searcher | 0 | 0 | 3 | 0 | 0 |  |
| noun = inbox email | 0 | 18 | 12 | 0 | 6 | 36 |
| verb delete | 0 | 3 | 2 | 0 | 1 |  |
| verb forward | 0 | 3 | 2 | 0 | 1 |  |
| verb print | 0 | 3 | 2 | 0 | 1 |  |
| verb put in folder | 0 | 3 | 2 | 0 | 1 |  |
| verb reply | 0 | 3 | 2 | 0 | 1 |  |
| verb view | 0 | 3 | 2 | 0 | 1 |  |
| ifc browser | 0 | 0 | 12 | 0 | 6 |  |
| ifc phone | 0 | 18 | 0 | 0 | 0 |  |
| platform widget | 0 | 6 | 0 | 0 | 6 |  |
| platform Firefly | 0 | 6 | 6 | 0 | 0 |  |
| platform Internet Searcher | 0 | 6 | 6 | 0 | 0 |  |

And the summary report can be generated as follows:

```
Total content space size (number user stories) = 55
Folding used: none
Folded cells = 0
Number user stories marked n/a = 0
Number user stories marked future = 18
Number user stories marked nochange = 26          70.3%
Number user stories marked changed = 0            0.0%
Number user stories marked new = 11               29.7%
priorities 1-5: 0 0 0 0 0
6-10: 0 0 0 0 0
unassigned: 11

Total shipped user stories = 37                   100.0%
Number of new & changed user stories = 11
Number of grouping filters = 0
Number of cells matched by grouping filters = 0
Number of user story groups = 0
Number nouns with n/c, changed or new = 3
Number n&c stories with multi requirements = 0
Percentage changed with reqt tag = 0.0%
Percentage new with reqt tag = 0.0%
Net number of user stories written = 37
Totals cross check is ok: shipped + future + n/a = raw
Total output check is ok . . .
raw - n/a - future - grouped + groupers = written
Elapsed seconds = 0.02
wed, 23 Feb 2011, 15:20:49
```

Figure 12:
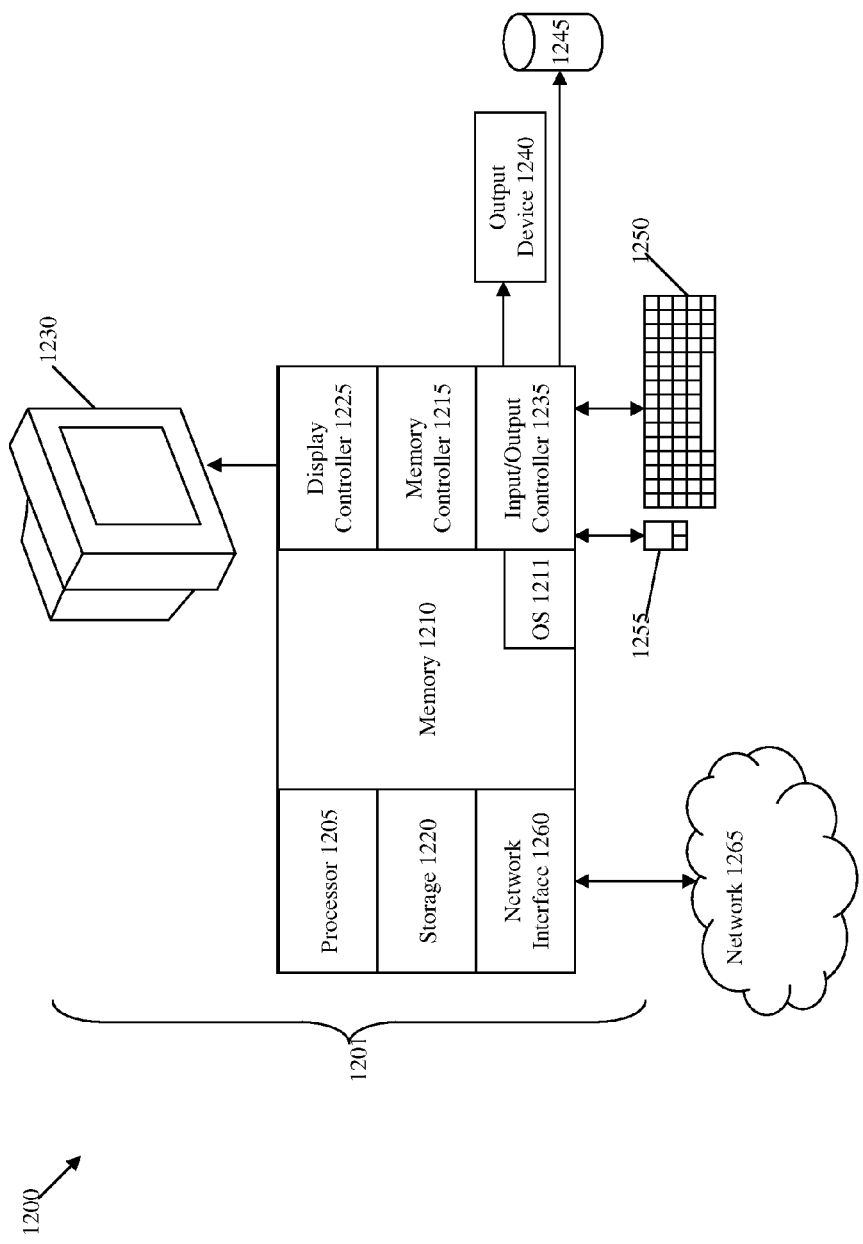
FIG. 12 illustrates an exemplary embodiment of a system for automatically generating agile user stories for software products.

The exemplary automatic agile user story generation methods described herein can be implemented on any suitable computer system as now described. FIG. 12 illustrates an exemplary embodiment of a system 1200 for automatically generating agile user stories for software products. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 1200 therefore includes general-purpose computer 1201.

In exemplary embodiments, in terms of hardware architecture, as shown in FIG. 12, the computer 1201 includes a processor 1205, memory 1210 coupled to a memory controller 1215, and one or more input and/or output (I/O) devices 1240, 1245 (or peripherals) that are communicatively coupled via a local input/output controller 1235. The input/output controller 1235 can be, but is not limited to, one or more buses or other wired or wireless connections, as is known in the art. The input/output controller 1235 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 1205 is a hardware device for executing software, particularly that stored in memory 1210. The processor 1205 can be any custom made or commercially available processor, a central processing unit (CPU), an auxiliary processor among several processors associated with the computer 1201, a semiconductor based microprocessor (in the form of a microchip or chip set), a macroprocessor, or generally any device for executing software instructions.

The memory 1210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1210 may incorporate electronic, magnetic, optical, and/or other types of storage media. Note that the memory 1210 can have a distributed architecture, where various components are situated remote from one another, but can be accessed by the processor 1205.

The software in memory 1210 may include one or more separate programs, each of which comprises an ordered listing of executable instructions for implementing logical functions. In the example of FIG. 12, the software in the memory 1210 includes the agile user story generation methods described herein in accordance with exemplary embodiments and a suitable operating system (OS) 1211. The OS 1211 essentially controls the execution of other computer programs, such the agile user story generation systems and methods as described herein, and provides scheduling, input-output control, file and data management, memory management, and communication control and related services.

The agile user story generation methods described herein may be in the form of a source program, executable program (object code), script, or any other entity comprising a set of instructions to be performed. When a source program, then the program needs to be translated via a compiler, assembler, interpreter, or the like, which may or may not be included within the memory 1210, so as to operate properly in connection with the OS 1211. Furthermore, the agile user story generation methods can be written as an object oriented programming language, which has classes of data and methods, or a procedure programming language, which has routines, subroutines, and/or functions.

In exemplary embodiments, a conventional keyboard 1250 and mouse 1255 can be coupled to the input/output controller 1235. Other output devices such as the I/O devices 1240, 1245 may include input devices, for example but not limited to a printer, a scanner, microphone, and the like. Finally, the I/O devices 1240, 1245 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 1200 can further include a display controller 1225 coupled to a display 1230. In exemplary embodiments, the system 1200 can further include a network interface 1260 for coupling to a network 1265. The network 1265 can be an IP-based network for communication between the computer 1201 and any external server, client and the like via a broadband connection. The network 1265 transmits and receives data between the computer 1201 and external systems. In exemplary embodiments, network 1265 can be a managed IP network administered by a service provider. The network 1265 may be implemented in a wireless fashion, e.g., using wireless protocols and technologies, such as WiFi, WiMax, etc. The network 1265 can also be a packet-switched network such as a local area network, wide area network, metropolitan area network, Internet network, or other similar type of network environment. The network 1265 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 1201 is a PC, workstation, intelligent device or the like, the software in the memory 1210 may further include a basic input output system (BIOS) (omitted for simplicity). The BIOS is a set of essential software routines that initialize and test hardware at startup, start the OS 1211, and support the transfer of data among the hardware devices. The BIOS is stored in ROM so that the BIOS can be executed when the computer 1201 is activated.

When the computer 1201 is in operation, the processor 1205 is configured to execute software stored within the memory 1210, to communicate data to and from the memory 1210, and to generally control operations of the computer 1201 pursuant to the software. The agile user story generation methods described herein and the OS 1211, in whole or in part, but typically the latter, are read by the processor 1205, perhaps buffered within the processor 1205, and then executed.

When the systems and methods described herein are implemented in software, as is shown in FIG. 12, the methods can be stored on any computer readable medium, such as storage 1220, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, Pyhon or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the agile user story generation methods are implemented in hardware, the agile user story generation methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects include the ability to measure the completeness of automated testing in terms of total announced function for a software product. The systems and methods described herein further automatically load project management tools with results of requirements analysis. The systems and methods described herein can further automatically accumulate user story cost history and use the user story cost history to estimate and plan future releases. The systems and methods described herein can be applied to almost any type of software from applications to middleware, to internal operating system components, or deep infrastructure layers (e.g. a unique runtime such as a JVM, or a protocol stack like TCP/IP). This generality is achieved due to the generality of the of the five dimensions of the content space, and the adaptive flexibility in defining the values for the five dimensions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method for generating user stories, the method comprising:
    defining a content space having a plurality of cells, each of the plurality of cells corresponding to each of the user stories, each of the plurality of cells having multiple dimensions, each of the multiple dimensions having one or more values, the multiple dimensions including release, noun, verb, interface, and platform, wherein the verb, interface and platform dimensions are orthogonal and noun-specific;
    collecting, by a processor, a plurality of requirements;
    creating, by the processor, a plurality of content space specification files that includes the plurality of requirements;
    processing, by the processor, the plurality of content space specification files to generate the user stories;
    determining an agreement that each of the plurality of user stories relate to a given software product; and
    outputting, by the processor, the user stories.

2. The method as claimed in claim 1 wherein processing the plurality of content space specification files comprises identifying content space specification statements in each of the plurality of content space specification files.

3. The method as claimed in claim 1 further comprising traversing, by the processor, the content space to generate the user stories.

4. The method as claimed in claim 1 wherein the multiple dimensions include a noun dimension.

5. The method as claimed in claim 1 wherein traversing the content space comprises:
    for each of the noun dimensions, for each of the plurality of cells:
        traversing, by the processor, other dimensions of the multiple dimensions of the cell, one value at a time, to generate the user story corresponding to the cell.

6. The method as claimed in claim 1 further comprising grouping, by the processor, the content space.

7. The method as claimed in claim 1 further comprising folding, by the processor, the content space.

8. A computer-implemented method for generating user stories, the method comprising:
    collecting a plurality of requirements;
    defining a content space including a plurality of cells, each cell defining an agile story, each cell having a plurality of dimensions, each of the multiple dimensions having one or more values, the multiple dimensions including release, noun, verb, interface, and platform, wherein the verb, interface and platform dimensions are orthogonal and noun-specific;
    creating a plurality of content space specification files that includes the plurality of requirements;
    traversing at least one dimension of each of the plurality of cells to generate a user story; and
    generating reports defining each of the user stories.

9. A computer program product for generating user stories, the computer program product including a non-transitory computer readable medium storing instructions for causing a computer to implement a method, the method comprising:
    defining a content space having a plurality of cells, each of the plurality of cells corresponding to each of the user stories, each of the plurality of cells having multiple dimensions, each of the multiple dimensions having one or more values, the multiple dimensions including release, noun, verb, interface, and platform, wherein the verb, interface and platform dimensions are orthogonal and noun-specific;
    collecting a plurality of requirements;
    creating a plurality of content space specification files that includes the plurality of requirements;
    processing the plurality of content space specification files to generate the user stories;
    determining an agreement that each of the plurality of user stories relate to a given software product; and
    outputting the user stories.

10. The computer program product as claimed in claim 9 wherein processing the plurality of content space specification files comprises identifying content space specification statements in each of the plurality of content space specification files.

11. The computer program product as claimed in claim 9, wherein the method further comprises traversing the content space to generate the user stories.

12. The computer program product as claimed in claim 11 wherein the multiple dimensions include a noun dimension.

13. The computer program product as claimed in claim 12 wherein traversing the content space comprises
    for each of the noun dimensions, for each of the plurality of cells:
        traversing, by the processor, other dimensions of the multiple dimensions of the cell, one value at a time, to generate the user story corresponding to the cell.

14. The computer program product as claimed in claim 9, wherein the method further comprises grouping the content space.

15. The computer program product as claimed in claim 9, wherein the method further comprises folding the content space.

16. A system for generating user stories, the system comprising:
    a processor configured for:
    defining a content space having a plurality of cells, each of the plurality of cells corresponding to each of the user stories, each of the plurality of cells having multiple dimensions, each of the multiple dimensions having one or more values, the multiple dimensions including release, noun, verb, interface, and platform, wherein the verb, interface and platform dimensions are orthogonal and noun-specific;
    collecting a plurality of requirements;
    creating a plurality of content space specification files that includes the plurality of requirements;
    processing the plurality of content space specification files to generate the user stories;
    determining an agreement that each of the plurality of user stories relate to a given software product; and
    outputting the user stories.

* * * * *